Nov. 25, 1952  C. H. PARSONS ET AL  2,619,232
CREAM STRAINER
Filed Jan. 13, 1948  2 SHEETS—SHEET 1
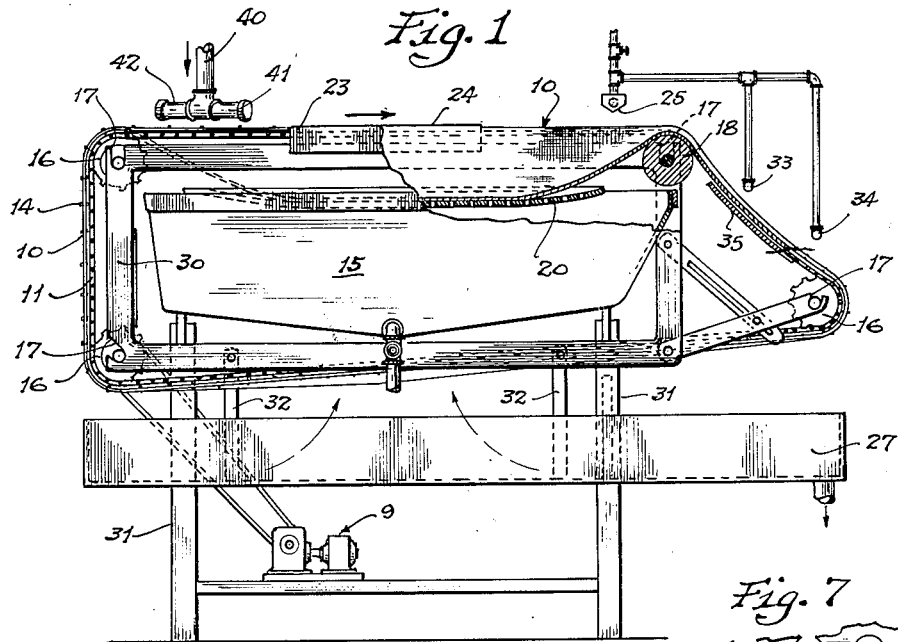
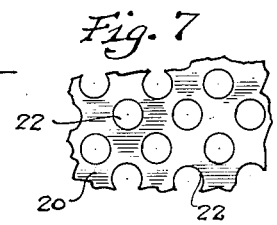
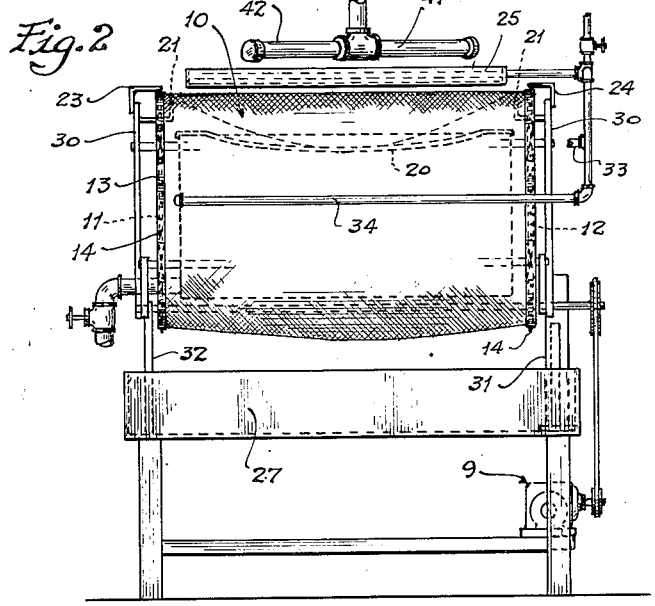
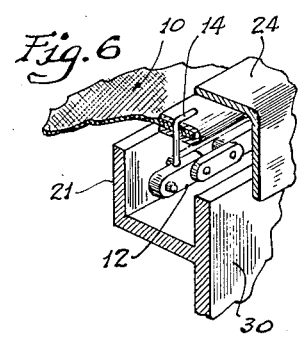
INVENTORS
Willard W. West
Clinton H. Parsons
Willard S. Campbell
BY R. G. Story
ATTORNEY Nov. 25, 1952 — C. H. PARSONS ET AL — 2,619,232
CREAM STRAINER
Filed Jan. 13, 1948 — 2 SHEETS—SHEET 2
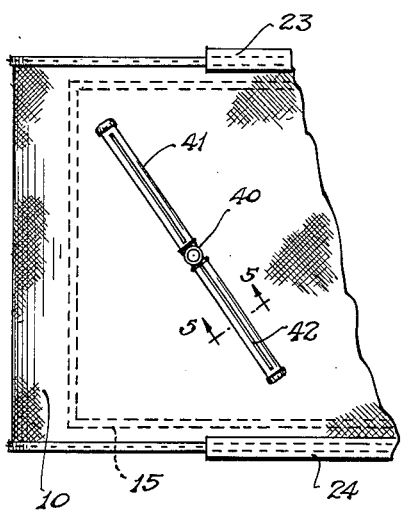
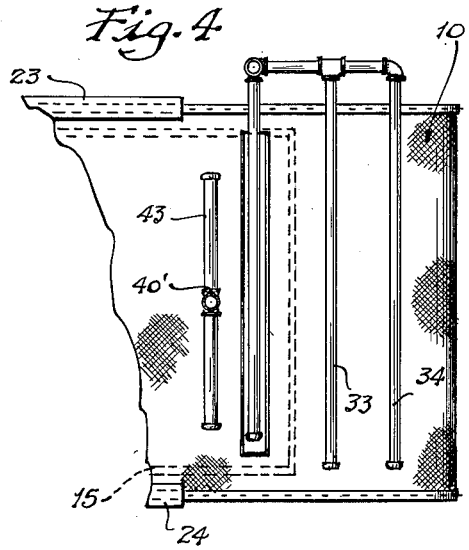
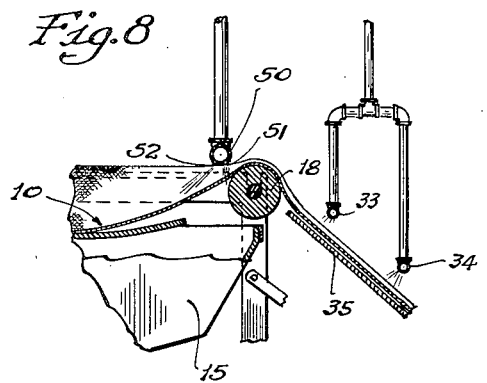
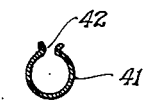
Fig. 5
INVENTORS
Willard W. West
Clinton H. Parsons
Willard S. Campbell
BY R. G. Story
ATTORNEY Patented Nov. 25, 1952

2,619,232

UNITED STATES PATENT OFFICE 2,619,232

CREAM STRAINER

Clinton H. Parsons, Tampa, Fla., Willard S. Campbell, Chicago, Ill., and Willard W. West, Oklahoma City, Okla., assignors, by mesne assignments, to Swift & Company, a corporation of Illinois Application January 13, 1948, Serial No. 1,944

5 Claims. (Cl. 210—198)

This invention relates to an improvement in cream filters and especially to a continuously moving endless screen type of cream strainer.

It is an object of this invention to provide a simplified and more efficient filtering means.

It is another object of this invention to provide a simplified filtering system which may be more easily cleaned.

It is a further object of this invention to provide an improved filtering screen supporting and carrying means.

Yet another object of this invention is to provide an improved cleaning action adapted for use in conjunction with a continuously moving filter screen.

Another object of this invention is to provide an improved screen mounting and cleaning system whereby wear is minimized, thus prolonging the life of the screen.

Another object of this invention is to provide an improved filtering method for straining cream.

Another object of this invention is to improve the means for feeding cream to an endless filtering-screen type of cream strainer.

Another object of this invention is to provide an improved means for stripping residual cream from an endless filtering screen as the screen passes to the outlet end of the machine.

Other objects will appear more fully from the specification below.

In the drawings:

Figure 1 is a side elevation of the machine forming the subject of this invention, partly broken away;

Figure 2 is an end elevation of the machine shown in Figure 1;

Figure 3 is a plan view of the machine shown in Figure 1;

Figure 4 is a plan view of the machine shown in Figure 1 with an alternate form of cream-feeding device;

Figure 5 is a section taken on line 5—5 of the cream-feeding means, shown in Figures 1 and 3;

Figure 6 is a detailed perspective view of the screen mounting and guiding means;

Figure 7 is a fragmentary plan view of the screen-supporting plate; and

Figure 8 is a sectional detail side elevation, showing an alternate means for stripping residual cream from the screen as the screen passes to the outlet of the machine.

Various filtering devices have been used in the past to separate cream from any extraneous matter which may possibly be present as it is delivered to the dairy plant, and a quite useful device for this purpose is shown in the patent to E. M. Davis, 2,043,371, for a Strainer, dated June 9, 1936. The machine shown in the Davis patent makes use of a continuously moving endless filtering screen upon which the cream to be treated is deposited. As the screen moves along in a substantially horizontal plane, the cream filters through the mesh of the screen and is caught in a suitable receptacle disposed below the filtering zone, leaving any extraneous matter on the screen. At the end of the horizontal filtering run, the screen passes between a pair of wringer rolls which serve to strip any remaining cream from the screen, and such cream is collected in a second receptacle disposed under the screen adjacent to the wringer rolls. The filter screen is then showered with a suitable washing fluid, and scrubbing means are operative to remove the debris from the screen. The screen is then passed through a second pair of wringer rolls to dry it before returning the screen to the filtering zone.

The screen of the Davis type strainer preferably takes the form of an endless belt of voile provided with a canvas edging on each side, the screen being supported on sprocket belts carried in suitable guide means fixed along opposite sides of the machine. The screen may take the form of a belt of voile of approximately 60 to 64 mesh and, when used with the above-described structure, is quite operative to effect a very efficient separation of extraneous matter from cream.

The present invention provides an improvement upon this Davis type of cream strainer and resides in a simplification of the screen supporting and washing means. The herein-disclosed modification of the Davis type structure results in improved wearing characteristics for the filter belt, and permits an easier and quicker cleaning of the machine between runs. Also, and most important, more efficient filtration of the cream is accomplished.

Referring to the drawings, the preferred form of the present invention is shown and it will be seen that an endless screen 10 is suspended from sprocket chains 11 and 12, mounted to move in paths adjacent opposite sides of the machine. The chains 11 and 12 may be driven in a conventional manner from the motor, and speed-reducer 9 carried in the frame of the machine. This screen may be, and preferably is, made of voile having a mesh of about 60 to 64, and the voile screen may be edged with a canvas binding 13 having eyelets fixed therein for cooperating with pins 14 fixed to the endless chains 11 and 12.

The paths in which sprocket chains 11 and 12 move, as best shown in Figure 2, are close to and substantially parallel with the side edges of a filtered cream collecting receptacle 15. The sprocket chains which support the screen are carried upon suitable sprocket wheels 16 disposed at the four corners of the side frame of the machine, whereby the chain is formed roughly into a trapezium shape, and when the screen is suspended from both of the sprocket chains 11 and 12, it surrounds the collecting tank 15 with the upper run of the screen stretched laterally over the open upper side of the collecting receptacle 15. Suitable drive means are provided to carry the sprocket chains forwardly together in the direction of the arrow, Figure 1, and the endless belt moves over the collecting means so that cream may be filtered through the voile, thus leaving extraneous matter on the top of the screen.

The sprocket wheels are mounted on axles which are carried in slotted bearings 17 from which each of the whole sprocket and screen roller supporting assemblies may be quickly removed during the cleaning-up operation. The screen is supported intermediate each of the pairs of the sprockets 16 at each corner on transverse supporting rollers 18 best seen in the cutaway portion of Figure 1. It is to be noted that the particular roller 18 disposed at the end of the filtering run of the screen and shown in the cutaway section, in addition to supporting the screen, also serves to strip off the cream or fat adhering to the underside of the screen. In this action, the roller acts somewhat like a squeegee and ensures a complete removal of all the filtered cream that passes through the screen.

As the sprocket chains 11 and 12 move across the upper run with the endless belt, each of the sprocket chains is engaged in suitable guide tracks 21, which cause the chains to follow the generally horizontal path, best shown in Figure 1. However, due to the bagging of the screen because of the loading thereof with cream, giving the screen a dished configuration, the screen is caused to move uphill for about one-half of the length of its movement across the upper run and then the screen turns downwardly over the roller 18 so that the endless screen is carried rapidly down and around the end of the tank 15. The guide means 21 forming longitudinal supports for the chains and screen extend only along the upper edges of the collecting tank, the chains being freely suspended between the sprocket wheels at all other points to support and carry the screen around the remaining sides of the tank and upwardly to the beginning of the upper run.

The guides 21 are fixedly supported from the frame of the machine and have their track portions disposed to cooperate with the inside walls of the sprocket chains to hold the chains spread apart while the screen carries the charge of cream being filtered. At about midway across the upper run of the chains, cap elements 23 and 24 are fixed to the frame to confine the chains in the guides to prevent the supporting chains from being rolled out of the guides 21 when the screen is loaded.

As the screen moves across its upper run, cream is showered onto its upper surface from a suitable supply pipe 40, and the cream is carried forwardly until it filters through the screen. If for any reason the cream does not quickly filter through, it is tumbled back down over the screen when the screen turns uphill, until it flows through.

Any desired means may be provided for feeding the cream onto the screen such that the cream will fall gently onto it in a manner to minimize the formation of foam. A device that is well adapted for this purpose is shown in Figures 1, 3 and 5 of the drawings. In this cream feeder, the raw cream is fed downwardly through the vertically disposed supply pipe 40 from where it flows out into the horizontal cream supply header 41. As best shown in Figure 3, the header extends across the width of the screen, but it is diagonally disposed with respect to the direction of movement of the screen in order to lengthen or, in effect, spread out, the zone on the screen upon which the cream is deposited.

The cream supply header has a cross-sectional arrangement as is best shown in Figure 5. The header takes a relatively large tubular form having a slot 42 along its upper surface. The cream is delivered into the center of the header 41, from where it flows laterally into the horizontal arms forming the header, and issues upwardly through the slot 42. The pressure on the cream supply is controlled so that the cream gently flows out through the slot and then flows down around the outside of the header from where it falls onto the screen. Preferably the header is located as close as possible to the surface of the screen.

It is apparent that the cream must be forced through the supply pipe 40 under some degree of pressure. However, this pressure is substantially dissipated as the cream flows laterally in the header under conditions which preclude the formation of foam. Thus, as the cream is fed onto the screen with this form of a feeding system, the cream issues through the slot 42 in the header and falls down onto the screen in a gentle fashion such that it is not unduly agitated. This tends to minimize the production of foam. It is also to be noted that when the cream is placed on the screen in a manner such that it has the least possible force behind it, any particles of foreign matter disposed on the upper surface of the screen are not forced or beaten through it.

In Figure 4 an alternate system for feeding cream to the screen is provided wherein the cream is supplied downwardly through a header 40'. The cream is forced laterally from the supply in a header 43 and falls downwardly from the header onto the screen. It has been found, in the handling of cream having a lower than average fat content, that a more rapid straining of the cream can be accomplished with a minimum production of foam when the cream is fed onto the screen adjacent the outlet end of its filtering run. As the cream showers down onto the screen from this alternate feed system, it quickly flows over the face of the screen and fills the surface of the screen throughout the entire filtering run. The supply header 43 can take a form similar to the header 41 described above, or any other suitable means that is effective to gently drop the cream onto the screen.

When the screen just about reaches the crest of the hill, a bare trickle of water may be released over the screen through a V-shaped trough 25 that is provided with a number of small perforations in the bottom thereof. The water dripping onto the screen at this point serves to dilute any cream carried up to the crest of the hill on the screen to just the necessary degree to cause all of this cream to flow through the screen into the tank 15. The flow of water is carefully controlled, however, and none is permitted to roll downhill, the flow being just sufficient to condition the cream carried on the screen so that it will flow through the screen.

In place of the water-washing means 25 described above, a steam-blowing means can be substituted therefor to strip the residual cream from the screen strainer. The steam type of stripping means is particularly useful where the cream being strained is of such a type that it has an undue tendency to produce foam.

Referring to Figure 8, a preferred form of steam-blowing construction is disclosed, and it includes a horizontal steam header 50, which is positioned just above the screen and in front of the roller 18 which supports the screen at the outlet end of the machine. The header 50 is provided with a series of ports 51 that is designed to blast steam against the screen 10 in a direction at approximately a right angle with respect to the screen. As steam issues through ports 51, any cream particles which are held between the interstices of the screen are blown through so that this residual cream may be deposited in the tank 15. Another set of ports 52 is provided in header 50 through which steam blows out over the approaching screen in a direction substantially parallel with the surface of the screen 10. The steam blowing from ports 52 serves to simultaneously roll back foam traveling up the screen which would otherwise be carried over into the waste, and it also tends to break down the foam so that the cream particles forming the bubbles will pass through the strainer.

The steam-blowing type of cream stripping means serves to effectively remove all of the residual cream, including the foam from the strainer. This steam-blowing stripping action is accomplished, of course, without in anywise disturbing the material filtered out of the cream and carried on the upper surface of the screen. A further and very important advantage is derived from the use of this means in that little or no dilution of the cream is noted.

To aid in supporting the screen and also to effect stripping of filtered cream from its underside, the screen drags over a polished plate 20 having a dished configuration about the bag in the upper run of the screen supported like a cover on tank 15. The plate 20 is filled with apertures 22, and the cream or fat passing through the screen and collecting on the underside of the screen is scraped loose to fall through the apertures into tank 15. The plate 20 is, of course, supported on tank 15 in such a manner that it may be quickly removed for cleaning.

The frame of the machine is a unitary structure having a cantilever design to support the tank and the sprockets and screen surrounding the tank. Referring to Figure 2, the frame 30 of the machine is shown mounted on the posts 31, which are integral with the base of the machine along one side. This construction provides a gap on the other side of the machine so that the screen can be easily mounted around the tank 15. During normal operation, however, the gap between the frame and the base of the machine at this opposite side may be closed by legs 32. The legs are pivotally mounted on the frame whereby they may be swung upwardly from the full line position shown in the Figure 1 to permit the removal and insertion of the screen. The weight of the front part of the frame is thus normally carried through legs 32 to the main underframe of the machine.

A suitable slack-producing means is provided in the sprocket chain support, and the endless screen carried on the chains may be easily placed in operative position on the machine after legs 32 have been lifted from the full line position. When the machine is in operation, the swinging legs 32 are lowered to provide a more rigid support for that side of the frame of the machine as above explained.

In order to clean the screen during normal operation of the machine, suitable shower means 33 and 34 are provided, which spray wash water onto the downwardly moving screen. A suitable plate 35 is fixedly mounted behind the screen to back it up while the shower impinges on the upper surface of the screen whereby debris is flushed off the screen without being washed through the meshes thereof.

Any conventional power drive may be provided to drive both sprocket chains forwardly at the same rate.

In the operation of the machine, the endless belt is started in motion and then the cream supply is turned on to shower cream onto the screen of the machine. The raw cream drops onto the filter screen and passes through or is carried forwardly and finally uphill as the screen is carried along with the sprocket chains engaged in the guide means 21 and 22. Any of the cream that is carried uphill is tumbled back down over the screen by the force of gravity, and in this manner the cream is caused to filter through the screen rather than be carried over the crest of the hill. As the screen traverses the upper run over tank 15, the cream filters through the screen and is scraped off the underside of the screen by the edges of holes 20' so that it falls through into tank 15.

Upon continued movement, the screen reaches the brow of the hill where shower 25 and the roller 18 strip the cream from the screen. As the screen starts downhill it is showered with a flushing fluid whereby any extraneous matter which might have been present in the cream and deposited on the screen is loosened and carried off of the screen to condition the screen for its return to the filtering cycle. The water or flushing fluid, together with the debris, falls from the screen into the pan 27 as the screen 10 passes around the back run of the machine to begin the filtering cycle.

The cream filtering and screen flushing operations are accomplished most efficiently by disposing the screen at such angle that the cream is filtered by rolling the cream back on the screen and the flushing fluid is drained rapidly from the screen. The cantilever structure of the frame, together with the sprocket mountings, permits the screen to be more rapidly installed or removed from the machine, and, further, provision of the improved flushing means here shown makes it possible to clean the machine more rapidly and minimizes wear on the screen. The hereindescribed structure is operative to complete the filtration of the cream in one step with a more complete recovery of the cream and with a freer elimination of extraneous matter from the screen.

It is intended that the description, given above, of the preferred form of this invention be considered as typical only. Many modifications will occur to those skilled in the art, which will fall within the scope of the following claims.

We claim:

1. A filtering device for purifying cream comprising an endless fine mesh filter screen, a portion only of said screen serving as a filter medium at any given instant in the operating cycle of the machine, means from which said screen is loosely suspended, said means including a pair of transverse supports spaced from each other longitudinally of said screen, said means also including a longitudinal support along each edge of said screen between said transverse supports whereby a dished depression is maintained in the portion of said loosely-suspended screen bounded by said supports, means for driving said screen around an endless path, means for feeding the cream to be filtered onto the upper surface of said portion of the screen, additional supporting means, including a relatively fixed member having a smooth supporting surface disposed under said dished depression to support the center area of said dished portion of said screen, said member being also dished about said portion of said screen with the curvature of said member being less than that of said screen, said additional supporting means being apertured and serving to also scrape the underside of the said portion, and receiving means disposed below the screen at said portion to catch the filtered cream.

2. A filtering device for purifying cream comprising an endless fine mesh filter screen, a portion only of said screen serving as a filter medium at any given instant in the operating cycle of the machine, means from which said screen is loosely suspended, said means including a pair of transverse supports spaced from each other longitudinally of said screen, said means also including a longitudinal support along each edge of said screen between said transverse supports whereby a dished depression is maintained in the portion of said loosely-suspended screen bounded by said supports, means for driving said screen around an endless path, means for feeding the cream to be filtered onto the upper surface of said portion of the screen, additional supporting means, including a relatively fixed member having a smooth supporting surface disposed under said dished depression to support the center area of said dished portion of said screen, said member being also dished about said portion of said screen with the curvature of said member being less than that of said screen, said additional supporting means being apertured and serving to also scrape the underside of the said portion, receiving means disposed below the screen at said portion to catch the filtered cream, and means including a bearing plate engaging against the underside of the screen to support an area of the screen and a shower directed at said area of the screen to flush said area of the screen clean after it passes from the filtering portion.

3. A filtering device for purifying cream comprising an endless fine mesh filter screen, a portion only of said screen serving as a filter medium at any given instant in the operating cycle of the machine, means from which said screen is loosely suspended, said means including a pair of transverse supports spaced from each other longitudinally of said screen, said means also including a longitudinal support along each edge of said screen between said transverse supports whereby a dished depression is maintained in the portion of said loosely-suspended screen bounded by said supports, means for driving said screen around an endless path, means for feeding the cream to be filtered onto the upper surface of said portion of the screen, additional supporting means including a relatively fixed member having a smooth supporting surface disposed under said dished depression to support the center area of said dished portion of said screen, said member being also dished about said portion of said screen with the curvature of said member being less than that of said screen, said additional supporting means being apertured and serving to also scrape the underside of the said portion, receiving means disposed below the screen at said portion to catch the filtered cream, and means including a sharply sloping bearing plate engaging against the underside of the screen to support an area of the screen and a high pressure shower directed at said area of the screen from the upper side to flush said area of the screen clean after it passes from the filtering portion.

4. A filtering device for purifying cream comprising an endless fine mesh filter screen, a portion only of said screen serving as a filter medium at any given instant in the operating cycle of the device, means from which said screen is loosely suspended, means for driving said screen around an endless path in a given direction, means for feeding cream to be filtered onto the upper surface of said portion of the screen to load said screen, additional supporting means including a relatively fixed plate having a smooth supporting surface disposed under and in intimate contact with substantially all of said portion to engage the underside of the loaded screen, said plate being positioned substantially below the means from which said screen is loosely suspended whereby a filtering pocket is formed in the upper portion of said screen, said plate being apertured and serving to also scrape the underside of the said portion, stripping means, including a steam header with a plurality of ports adjacent the upper surface of the said portion of the screen at one end of said portion, with respect to the direction of the movement of the screen, to project steam under pressure against the upper surface of the screen at said one end, said header and ports covering the width of said pocket and being so positioned that said projected steam has a component directed along said screen toward the other end of said portion to roll back foam travelling up the screen at said first mentioned end of said pocket, and receiving means disposed below the screen at said portion to catch the filtered cream.

5. A filtering device for purifying cream comprising an endless fine-mesh filter screen, a portion only of said screen serving as a filter medium at any given instant in the operating cycle of the device, means from which said screen is suspended, means for driving said screen around an endless path in a given direction, means for feeding cream to be filtered onto the upper surface of said portion of the screen to load said screen, steam supply means, stripping means including a steam header connected to said steam supply means and having a plurality of ports adjacent the upper surface of said portion of the screen at one end of said portion, with respect to the direction of movement of the screen, to project steam under pressure against the upper surface of the screen at said one end, said header and ports being linearly placed across substantially the entire width of said screen and being so positioned that said projected steam has a component directed along said screen toward the other end of said portion to roll back foam traveling up the screen in said given direction, and receiving means disposed below the screen at said portion to catch the filtered cream.

CLINTON H. PARSONS.
WILLARD S. CAMPBELL.
WILLARD W. WEST.

REFERENCES CITED

The following references are of record in the file of this patent:

UNITED STATES PATENTS

| Number | Name | Date |
| --- | --- | --- |
| 445,371 | Jewell | Jan. 27, 1891 |
| 461,232 | Birch | Oct. 13, 1891 |
| 583,361 | Droeshout | May 25, 1897 |
| 935,359 | Diver | Sept. 28, 1909 |
| 1,056,738 | Catlett et al. | Mar. 19, 1913 |
| 1,338,232 | McCaskell | Apr. 27, 1920 |
| 1,401,199 | Simpson et al. | Dec. 27, 1921 |
| 1,403,369 | Anderson | Jan. 10, 1922 |
| 1,528,187 | Farrel | Mar. 3, 1925 |
| 2,034,784 | Wallny | Mar. 24, 1936 |
| 2,043,371 | Davis | June 9, 1936 |
| 2,053,664 | Hiller et al. | Sept. 8, 1936 |
| 2,173,256 | Jordan | Sept. 19, 1939 |